(12) United States Patent
Drechsel

(10) Patent No.: US 10,386,867 B2
(45) Date of Patent: Aug. 20, 2019

(54) PRESSURE CONTROL DEVICE FOR A LIQUID

(71) Applicant: Arno Drechsel, Lienz (AT)

(72) Inventor: Arno Drechsel, Lienz (AT)

( * ) Notice: Subject to any disclaimer, the term of this patent is extended or adjusted under 35 U.S.C. 154(b) by 0 days.

(21) Appl. No.: 15/572,162

(22) PCT Filed: May 25, 2016

(86) PCT No.: PCT/IB2016/053047
§ 371 (c)(1),
(2) Date: Nov. 7, 2017

(87) PCT Pub. No.: WO2016/189466
PCT Pub. Date: Dec. 1, 2016

(65) Prior Publication Data
US 2018/0120866 A1    May 3, 2018

(30) Foreign Application Priority Data

May 25, 2015    (IT) .......................... 102015000016926

(51) Int. Cl.
*F16K 1/12*    (2006.01)
*F16K 1/42*    (2006.01)
*G05D 16/06*   (2006.01)

(52) U.S. Cl.
CPC ......... *G05D 16/0608* (2013.01); *F16K 1/126* (2013.01); *F16K 1/42* (2013.01); *G05D 16/0636* (2013.01)

(58) Field of Classification Search
CPC ..... Y10T 137/7808; F16K 1/126; F16K 1/42; G05D 16/0608; G05D 16/0636
USPC ....................................................... 137/505.25
See application file for complete search history.

(56) References Cited

U.S. PATENT DOCUMENTS

| 4,543,985 | A | * | 10/1985 | Healy | ................ | G05D 16/0663 |
| | | | | | | 137/505.21 |
| 5,875,815 | A | | 3/1999 | Ungerecht | | |
| 5,881,757 | A | | 3/1999 | Kuster | | |
| 2005/0224117 | A1 | * | 10/2005 | Youngberg | ........ | G05D 16/0608 |
| | | | | | | 137/505.25 |
| 2007/0028966 | A1 | * | 2/2007 | Feith | .................... | G05D 16/106 |
| | | | | | | 137/505.25 |
| 2007/0284004 | A1 | * | 12/2007 | Ungerecht | ......... | G05D 16/0655 |
| | | | | | | 137/505.25 |

(Continued)

FOREIGN PATENT DOCUMENTS

WO    2011138764    11/2011

*Primary Examiner* — William M McCalister
(74) *Attorney, Agent, or Firm* — Themis Law

(57) ABSTRACT

A pressure regulating device for a liquid includes a main hollow body having an inlet end and an outlet end for the liquid, which are connected via a longitudinal passage, a tubular valve member, which is slidingly accommodated in the passage and has a regulating end upstream from the flow of the liquid, a seat placed inside the passage, upstream from the valve member, and having a transverse surface formed in the passage to interact with the regulating end of the valve member and define therewith a part having an adjustable width for the liquid. The seat is eccentrically supported in the passage and is formed of one piece with the main body, and is supported proximate to the inlet end for the liquid by a pair of longitudinal support wings substantially parallel to the flow direction.

13 Claims, 3 Drawing Sheets

(56) References Cited

U.S. PATENT DOCUMENTS

| | | | | |
|---|---|---|---|---|
| 2012/0285557 A1* | 11/2012 | Ungerecht | .............. | F16K 1/123 |
| | | | | 137/528 |
| 2012/0285561 A1* | 11/2012 | Lawyer | .............. | G05D 16/0608 |
| | | | | 137/561 R |
| 2015/0293539 A1* | 10/2015 | Greenwood | ....... | G05D 16/0608 |
| | | | | 137/505.25 |

\* cited by examiner

PRESSURE CONTROL DEVICE FOR A LIQUID

FIELD OF THE INVENTION

The present invention generally finds application in the field of irrigation systems for agricultural and industrial applications, and a pressure control device for a liquid, particularly designed to be installed in irrigation systems or the like.

BACKGROUND ART

Agricultural and/or industrial irrigation systems are known in the art, which comprise a line for supplying an irrigation liquid, e.g. water, connected to a plurality of sprinkler devices for distributing a jet of such liquid to a soil portion to be irrigated.

A peculiar characteristic of these systems is that they distribute a constant amount of liquid to a given soil portion, to irrigate it in a substantially uniform manner.

Furthermore, the sprinkler devices may be either stationary, to always irrigate the same soil portion, or movable relative to the supply conduit for substantially constant-speed sweeping of a given cultivated surface.

Almost all the sprinklers for use in irrigation systems allow the jet nozzle to be changed or varied to adapt liquid distribution to the needs of the particular soil or crop.

Nevertheless, uniform liquid distribution requires a substantially constant jet pressure, regardless of the nozzle that is mounted to the sprinkler.

Therefore, a pressure regulating device, connected to the supply line, is often installed upstream from the nozzle, with liquid having a relatively constant pressure value at its outlet.

These devices have a fluidically connected tubular closure member therein, and a liquid stagnation chamber located proximate to the outlet and adapted to temporarily contain the liquid that builds up before being delivered through the nozzle. The backpressure generated in the chamber causes the closure member to move under the force exerted thereupon by a liquid fraction circulating in a calibrated orifice. The axial movement of the closure member changes the flow rate of the liquid circulating through the inlet and accordingly maintains the outlet pressure at a constant level.

U.S. Pat. No. 7,048,001 relates to a pressure regulating device that is specially designed to prevent grass or other materials to stop the movement of the closure member, thereby causing sudden pressure drops.

This device has a tubular body with a fluid inlet and a fluid outlet, connected via a central passage with a tubular plunger slidingly moving therein. A seat is also formed in the passage, facing one end of the plunger and adapted to cooperate therewith to change the amount of liquid circulating in the passage.

The seat radially projects toward the center of the passage and is supported by a single strut which extends from an annular member supported in the tubular body adjacent to the fluid inlet. The strut is also placed upstream from a face which is also placed upstream from the support ring.

A first drawback of this arrangement is that the pressure of the fluid that comes out of this device may be affected by non-negligible deviations from the desired value during operation of the system.

This is because the provision of a single support strut imparts a given elasticity to the seat, that can lead to a change of its axial position when the fluid in the supply circuit generates water hammers or when foreign matters such as grass, leaves, stones or the like.

Nevertheless, in addition to being flexible, the seat is also relatively fragile because it may be broken or damaged if a great stress is transferred thereupon.

A further drawback of this solution is that this seat is rigidly joined to an annular support that is distinct and separate from the enclosure of the device, which makes the assembly of the latter relatively complex, due to the great number of its parts.

Furthermore, this configuration increases both the manufacturing costs and the assembly time for the device.

Also, another drawback of this arrangement is that this device requires great care during inspection, as external pointed tools are used therefor, which may damage the seat.

Furthermore, in order to remove impurities such as grass, soil or the like, which build up at the seat during operation of the system, the device is often washed with an abrasive liquid, that might cause wear of the seat, thereby causing an undesired change of liquid delivery pressure.

Technical Problem

In light of the prior art, the technical problem addressed by the present invention may be deemed to consist in modifying prior art regulator devices to increase their sturdiness, reduce their complexity, facilitate their assembly and control, minimize the pressure changes of the outflowing liquid and maintain a substantially constant pressure.

DISCLOSURE OF THE INVENTION

The object of the present invention is to solve the above mentioned technical problem and obviate the above discussed drawback, by providing a pressure control device for a liquid that is highly efficient and relatively cost-effective.

A particular object of the present invention is to provide a pressure control device for a liquid in which the liquid outflow has a substantially constant pressure through all the operating conditions.

A particular object of the present invention is to provide a pressure control device for a liquid that can be easily manufactured and readily and easily assembled.

A particular object of the present invention is to provide a pressure regulating device that can be manufactured at a relatively low cost.

A particular object of the present invention is to provide a pressure control device for a liquid that is particularly sturdy and resistant.

A particular object of the present invention is to provide a pressure control device for a liquid that can be easily inspected once it has been installed in an irrigation system.

These and other objects, as better explained hereafter, are fulfilled by a pressure control device for a liquid as defined in claim 1.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a liquid pressure regulator device of the invention, which is described as a non-limiting example with the help of the annexed drawings, in which.

DETAILED DESCRIPTION OF A PREFERRED EMBODIMENT

Figure 1:
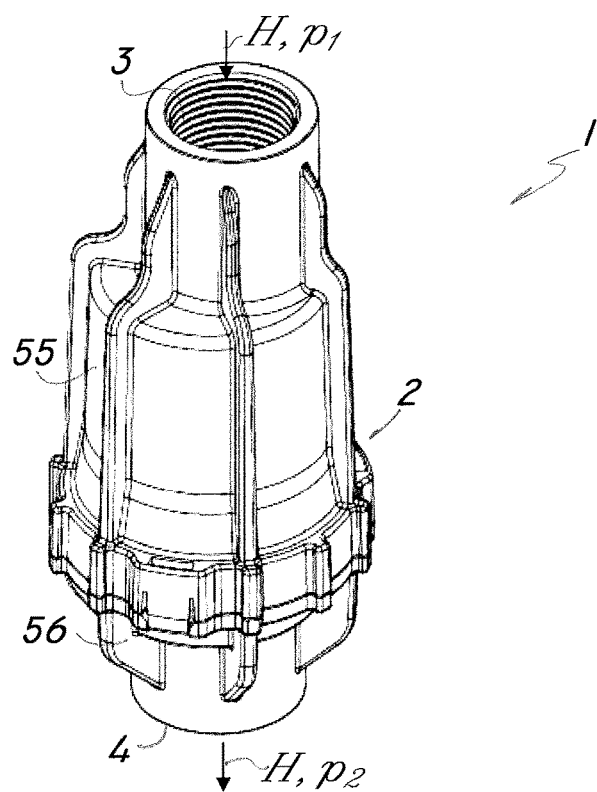
FIG. 1 is a perspective view of a pressure regulating device of the invention.
Figure 2:
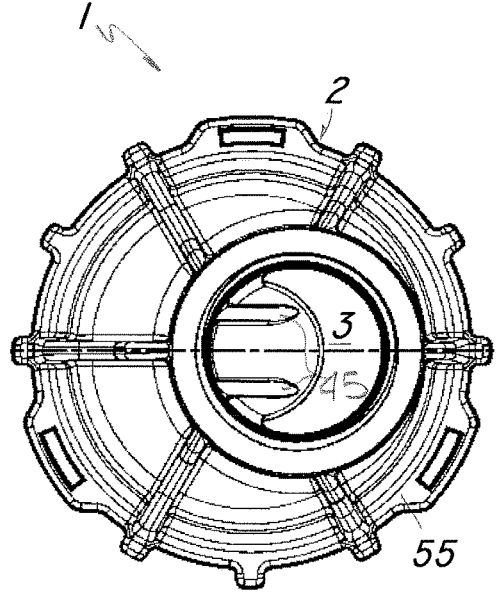
FIG. 2 is a top view of the device of FIG. 1.
Figure 3:
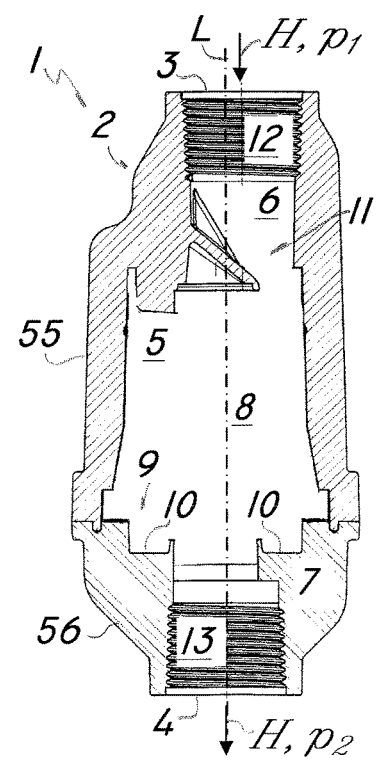
FIG. 3 is a partial lateral view of the device of FIG. 1.

Particularly referring to the figures, numeral 1 shows and designates a regulator device for regulating the pressure of a liquid H, e.g. water, that comes from a supply line A.

As a non limiting example, the regulator device 1 may be installed in irrigation systems for uniform distribution of the liquid H on a predetermined area to be irrigated or cooled, not shown.

The control device 1 may be installed upstream from the sprinklers, not shown, for the jet of liquid H to be delivered at a substantially constant pressure, substantially irrespective of the size of the delivery nozzle that is mounted to the sprinkler.

The pressure regulator device 1 of the invention comprises a main hollow body 2 having an inlet end 3 and an outlet end 4 for the liquid, and designed to be connected with the former to a supply line for the liquid H and with the latter to a sprinkler, both not shown.

In the illustrated embodiment, the main body 2 has a substantially tubular shape and defines an inner cavity 5 extending in a longitudinal direction L between the inlet end 3 and the outlet end 4.

The cavity 5 has narrow end portions 6, 7 associated with the inlet end 3 and the outlet end 4 of the body 2, and connected by a wider intermediate portion 8.

Conveniently, the wider portion 8 will be joined to the narrow end portion 7 associated with the outlet 4 via an annular step 9 having a substantially transverse flat surface 10.

Therefore, the cavity 5 provides fluid connection of the inlet end 3 and the outlet end 4 of the body via a longitudinal passage 11 for the liquid H.

In the illustrated embodiment, the passage 11 consists of an inlet portion 12 and an outlet portion 13 for the liquid H, which are in mutual fluid connection via an intermediate portion 14.

Conveniently, the inlet portion 12 and the outlet portion 13 of the passage 11 may be defined by the end portions 6, 7 of the cavity 5, whereas the intermediate portion 14 of the passage 11 will be formed at the wider portion 8 of the cavity 5.

Furthermore, the inlet portion 12, the outlet portion 13 and the intermediate portion 14 may be transversely offset from one another.

Particularly, each of the portions 12, 13, 14 may extend along respective longitudinal axes, $L_1$, $L_2$, $L_3$, each being transversely offset from the others.

As best shown in FIGS. 4, 5, 7A and 7B, the device 1 also has a tubular valve member 15, which is slidingly accommodated in the passage 11 and has a regulating end 16 upstream from the flow, proximate to the inlet 3 for the liquid H.

The valve member 15 also has an operating end 17, located downstream from the flow and facing the outlet 4 for the liquid H.

The valve member 15 is accommodated in the body 2 at the wider intermediate portion 8 of the cavity 5 and its regulating end 16 and operating end 17 are in fluid connection with the inlet portion 12 and the outlet portion 13 respectively of the passage 11.

Therefore, the internal part 18 of the valve member 15 defines the intermediate portion 14 of the longitudinal passage 11.

In the particular illustrated configuration of the invention, a substantially tubular sleeve 18 is inserted in the wider portion 8 of the cavity 5 in a peripheral position relative to the valve member 15.

The sleeve 19 has a transverse end wall 20 having a calibrated hole 21 for tightly allowing the passage of the valve member 15, and guiding it in its longitudinal movement.

Furthermore, an annular recess is formed on the outer surface 22 of the end wall 20 of the sleeve 19, for housing an O-ring 24, which is designed to interact with the cylindrical outer surface 25 of the valve member 15 to ensure therewith tightness against the fluid H as it slides.

The sleeve 19 also has an open end annular edge 26 opposite to the transverse wall 22 and facing the step 9.

An outer annular flange 27 is formed proximate to the operating end 17 of the valve member 15, facing the step 9 and having a radial housing 28 for a fixation ring 29 made of a polymeric material.

An elastic diaphragm 30, also having an annular shape and typically made of rubber, is interposed between the fixation ring 29 and the flange 27, with its inner peripheral edge 31 secured to the flange 27 and its outer peripheral edge 32 fastened to the body 2.

Particularly, the diaphragm 30 may have its inner peripheral edge 31 secured to the flange 27 via the fixation ring 29 and its outer peripheral edge 32 fastened to the body 2 via the open annular edge 26 of the sleeve 19.

The operating end 17 of the valve member 15 slidingly fits into the outlet portion 13 of the passage 11 with a calibrated play g, to form therewith an annular clearance 33 for the liquid H in fluid communication with the diaphragm 30.

The liquid H that flows through the clearance 33 will be collected in a regulating chamber 34 defined in the region between the annular step 9 and the membrane 30.

The volume V of the chamber 35 will be selected in a range from a zero value and a maximum value that will have been previously set by the manufacturer of the device 1.

The pressure p exerted by the liquid H collected in the regulating chamber 34 on the fixing ring 29 will cause the longitudinal translation of the valve member 15, such that its regulating end 16 will come near the liquid inlet portion 3.

Conveniently, a coil spring 35 with a calibrated spring modulus will be placed at the periphery of the valve member 15 and will act thereupon to counteract the force $F_1$ generated on the flange 27 by the pressure p of the liquid H collected in the regulating chamber 34, to maintain the regulating end 16 at a normal distance from the inlet 3 for the liquid H.

For this purpose, the spring 35 will have one end 36 against the flange 27 and the opposite end 37 interacting with the inner surface 38 of the end wall 20 of the sleeve 19.

Therefore, the regulating end 16 of the valve member 15 will move in the longitudinal direction according to the current amount of liquid H collected in the regulator chamber 34.

A seat 39 is formed in the passage 11, upstream from the valve member 15, and has a transverse surface 40 formed in the passage 11 to interact with the regulating end 16 of the valve member 15 and define a part 41 for the liquid H.

The part 41 will have a varying width w according to the current longitudinal position of the regulating end 16 relative to the transverse surface 40.

Figure 7A:
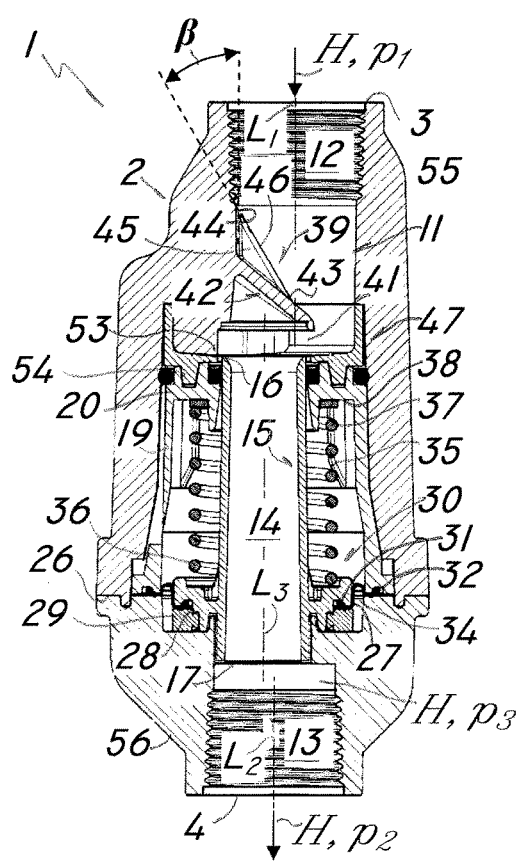
FIGS. 7A and 7B are lateral and broken-away views of the device of FIG. 1 in two different operating positions.

Particularly, the width w of the part 41 will have a maximum value $w_{max}$ when the regulating chamber 34 is empty and the regulating end 16 of the valve member 15 is maintained by the spring 35 in its normal position, as shown in FIG. 7A.

Figure 7B:
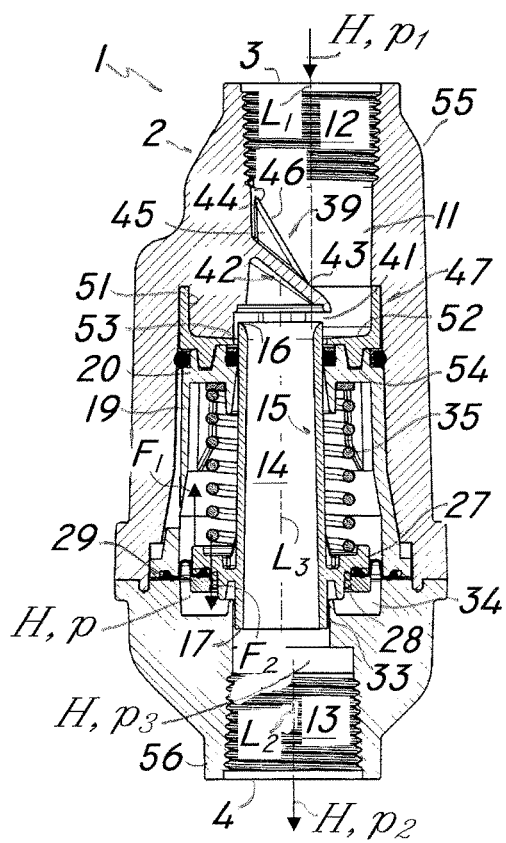

Conversely, the width w of the part 41 will have a minimum value $w_{min}$, always greater than zero, when there is a maximum volume V of liquid H in the regulating chamber 34 and the regulating end 16 of the valve member 15 is as close as possible to the seat 39, as shown in FIG. 7B.

Figure 4:
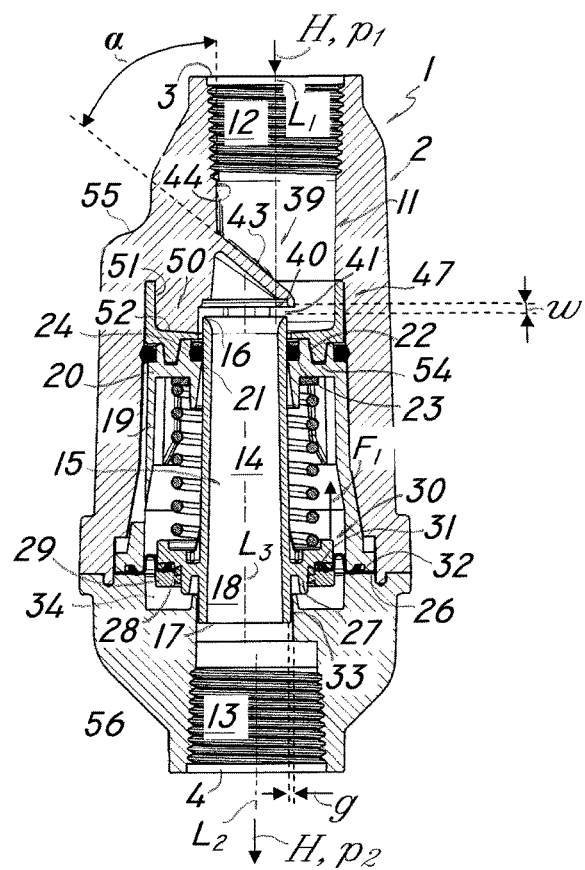
FIG. 4 is a lateral broken-away view of the device of FIG. 1.
Figure 5:
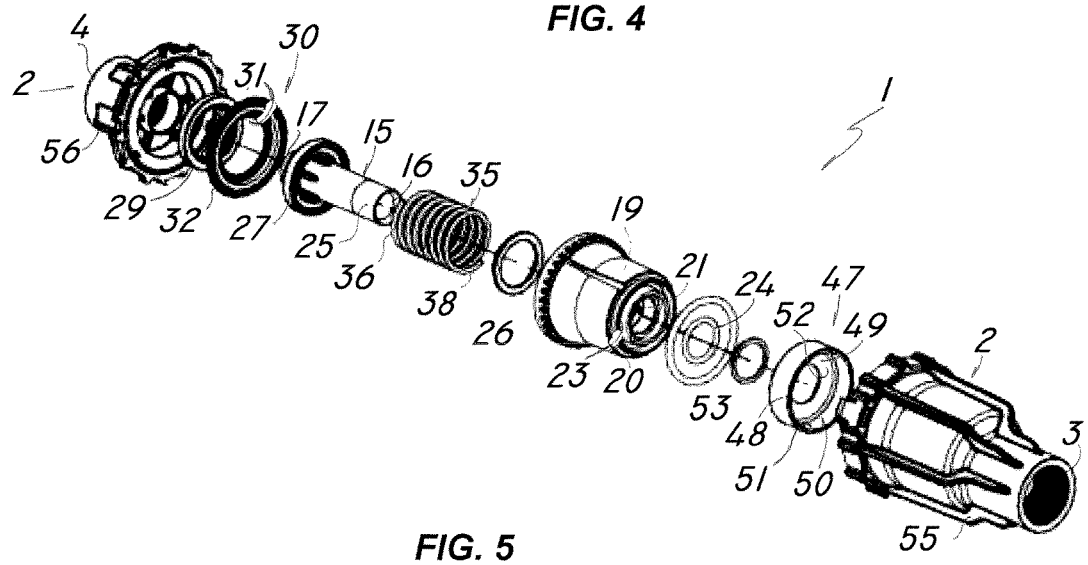
FIG. 5 is an exploded perspective view of the device of FIG. 1.
Figure 6:
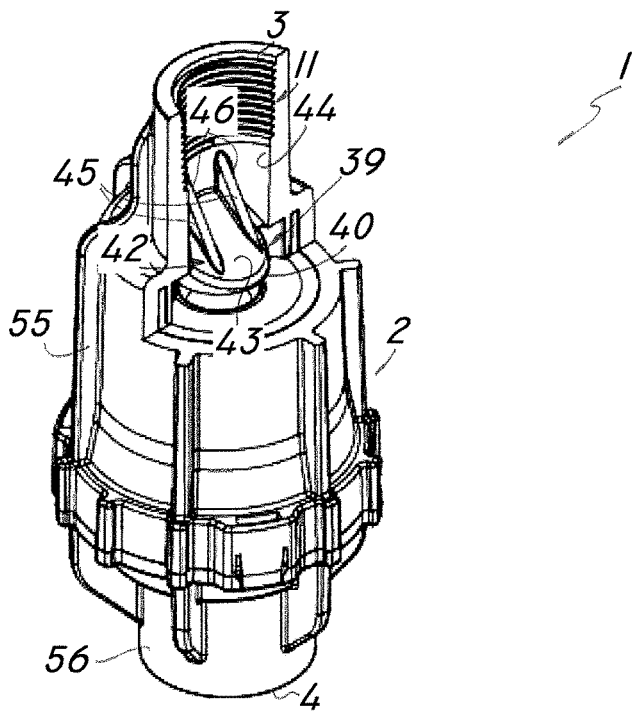
FIG. 6 is a partially broken-away perspective view of the device of FIG. 1.

Furthermore, as best shown in FIGS. 4, 7A and 7B, the transverse surface 40 of the seat 39 will consist of an annular edge, also referenced 40, formed at a projection 42 of the main body 2.

Advantageously, the projection 42 may have a substantially conical surface 43, inclined to the inner wall 44 of the passage 11, upstream from the flow.

The inclination of this upstream surface 43 to the inner wall 44 of the passage 11 forms an angle α that ranges from 40° to 55° and is preferably about 48°.

The inclination of the upstream surface 43 of the projection 42 will allow the flow of liquid H from the inlet end 3 to be gradually directed toward the part 41 to reduce turbulence occurring at the transverse surface 40 of the seat 39.

In a peculiar aspect of the invention, the seat 39 is eccentrically supported inside the passage 11 and is formed of one piece with the main body.

Furthermore, the seat 39 is supported proximate to the inlet end 3 for the liquid H via at least one pair of longitudinal support wings 45, substantially parallel to the flow direction.

Preferably, as shown in FIGS. 2, 4, 7A and 7B, the seat 39 may be formed in the inlet portion 12 of the passage 11 and its projection 42 may be connected to the inner wall 44 of the passage 11 via a pair of parallel longitudinal wings 45.

In the illustrated embodiment, that two longitudinal wings 45 have an inclined edge 46 which joins the projection 42 to the inner wall 44 of the passage 11.

The edge 46 may be inclined to the inner wall 44 of the passage 11 to form an inclination angle β that ranges from 25° to 45° and is preferably about 35°.

Preferably, an annular deflector 47 is placed inside the main body 2 in a peripheral position relative to the seat 39, to convey the flow of liquid H from the inlet end 3 toward the part 41.

The deflector 47 may include a tubular side wall 48 which is joined to the transverse wall 49 to define an inner surface 50 for conveying the liquid H, with an annular longitudinal section 51 connected to a flat transverse section 52.

Furthermore, the transverse wall 49 will have a central hole 43 for allowing the passage of the regulating end 16 of the valve member 15.

The deflector 47 may be accommodated in the main body 2 with its transverse wall 49 contacting the end wall 20 of the sleeve 19.

Particularly, the outer surface 22 of the sleeve 19 may define an abutment for the outer surface 54 of the battle 47, to establish an accurate constant position relative to the seat 39.

Conveniently, the main body 2 may have a first hollow portion 55 and a second hollow portion 56 that can be mutually interlocked. Nevertheless, the first 55 and second 56 hollow portions of the body 2 may be joined together by ultrasonic welding.

The first hollow portion 55 may include the inlet end 3 and the seat 39, whereas the second hollow portion 56 may include the outlet end 4.

The battle 47, the sleeve 19, the valve member 15 and the spring 35 may be inserted in the first hollow portion 55 of the body 2 to define the inlet portion 12 and the intermediate portion 14 of the passage 11.

Alternatively, the outlet portion 13 of the passage 11 and the annular step 9 may be formed on the second hollow portion 56 of the main body 2, to contain the regulating chamber 34.

In operation, the liquid H will have a pressure $p_1$ at the inlet 3 of the device 1, and a substantially constant pressure $p_2$ at the outlet 4. A sprinkler, not shown, and having a nozzle of predetermined size, also not shown, will be installed downstream from the device 1, for the flow of liquid H to be delivered at a pressure that is equal to or lower than the outlet pressure $p_2$.

If the pressure of the liquid H at the nozzle drops below the value $p_2$, a backpressure $p_3$, or stagnation pressure, is generated in the outlet portion 13 of the passage 11, to allow a fraction of the flow to enter the regulating chamber 34 through a calibrated clearance 33.

The volume V of the liquid H collected in the regulating chamber 34 will change according to the stagnation pressure value, and will particularly increase as stagnation pressure $p_3$ increases.

The pressure p exerted by the liquid H in the regulating chamber 34 on the fixation ring 29 generate a longitudinal force $F_1$ directed opposite to the circulation of the flow in the passage 11.

As soon as the force $F_1$ overcomes the counteracting force $F_2$ of the spring 35 at rest, the regulating end 16 of the valve member 15 will move toward the transverse surface 40 of the seat 39.

This controlled movement of the regulating end 16 will cause the width w of the part 41 to be reduced, and the flow rate of the liquid H through the intermediate portion 14 of the passage 11 to be also reduced.

Therefore, the width w of the part 41 will depend on the pressure $p_1$ of the liquid H at the inlets 3 of the device 1 and on the stagnation pressure $p_3$.

Particularly, with the outlet nozzle on the sprinkler being constant, as the stagnation pressure $p_3$ increases, the width w of the part 41 will progressively decrease to maintain a constant outlet pressure $p_2$ of the liquid H, by dynamically controlling the movement of the valve member 15 relative to the seat 39.

The pressure control device for a liquid of the invention is susceptible to a number of changes and variants, within the inventive concept disclosed in the appended claims. All the details thereof may be replaced by other technically equivalent parts, and the materials may vary depending on different needs, without departure from the scope of the invention.

While the pressure control device for a liquid has been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be produced on an industrial scale in factories manufacturing fluid pressure regulators or parts of irrigation systems.

The invention claimed is:

1. A pressure control device for a liquid (H), comprising:
a main hollow body (2) having an inlet end (3) for the liquid (H), an outlet end (4) for the liquid (H), which are connected via a longitudinal passage (11) and an inner cavity (5) extending therebetween, thereby defining a longitudinal passage (11) having a longitudinal axis (L) and connecting said inlet end (3) and said outlet end (4);
a tubular valve member (15), which is slidably housed in said passage (11) and has a regulating end (16) upstream of a flow of the liquid (H) therein;
a seat (39) formed inside said passage (11), upstream of said valve member (15), and having a transverse surface (40) formed in said passage (11) to interact with said regulating end (16) of said tubular valve member (15) and define therewith a part (41) of said passage having an adjustable width (w) for the liquid (H);
wherein said passage (11) has an inlet portion (12) and an outlet portion (13), which are joined together by an intermediate portion (14) having said tubular valve member (15) accommodated therein, said inlet portion (12), said outlet portion (13) and said intermediate portion (14) having respective longitudinal axes (L1, L2, L3) which are offset from one another; and
wherein said seat (39) is formed in said passage (11) around an axis (X) that is parallel and eccentric to the longitudinal axis (L) of said cavity (5) and is is of one piece with said main hollow body (2), said seat (39) being supported proximate to said inlet end (3) for the liquid (H) by at least one pair of longitudinal support wings (45) substantially which are planar and parallel to a flow direction.

2. The device as claimed in claim 1, wherein said transverse surface (40) consists of an annular edge formed in a projection (42) of said main hollow body (2).

3. The device as claimed in claim 2, wherein said projection (42) is connected to an inner wall (44) of said passage (11) via said at least one pair of longitudinal support wings (45).

4. The device as claimed in claim 3, wherein said projection (42) has an upstream surface (43) that is conical and inclined relative to the inner wall (44) of said passage (11), to gradually direct the flow of the liquid (H) toward said part (41) and reduce turbulence thereof.

5. The device as claimed in claim 1, further comprising an annular deflector (47) placed inside said main hollow body (2) at a periphery of said seat (39) to convey the flow of the liquid (H) into said part (41).

6. The device as claimed in claim 3, wherein said longitudinal support wings (45) have an edge (46) that is inclined relative to said inner wall (44) of said passage (11) to form an inclination angle (β) comprised between 35° and 45°.

7. The device as claimed in claim 1, wherein said inlet portion (12), said outlet portion (13), and said intermediate portion (14) are transversely offset from one another.

8. The device as claimed in claim 1, wherein said valve member (15) has an operating end (17) opposite to said regulating end (16) and further has a peripheral annular flange (27).

9. The device as claimed in claim 8, further comprising an elastic annular diaphragm (30) with an inner peripheral edge (31) secured to said peripheral annular flange (27) and an outer peripheral edge (32) locked on said main hollow body (2).

10. The device as claimed in claim 9, wherein the inner cavity of said main hollow body (2) has an annular step (9) proximate to said outlet end (4), and designed for defining, with said diaphragm (30), a regulating chamber (34) for regulating flow pressure of the liquid (H).

11. The device as claimed in claim 10, further comprising a tubular sleeve (19) accommodated in said cavity (5) and adapted to guide said valve member (15) in its longitudinal movement.

12. The device as claimed in claim 1, further comprising a coil spring (35) located at a periphery of said valve member (15) and acting thereupon to maintain said regulating end (16) away from said seat (39).

13. The device as claimed in claim 1, wherein said main hollow body (2) has a first hollow portion (55) comprising said inlet end (3) and said seat (39), and a second hollow portion (56) comprising said outlet end (4) and connectable by snap-fitting with said first hollow portion (55).

* * * * *